US012791098B2

(12) United States Patent
Stegman

(10) Patent No.: US 12,791,098 B2
(45) Date of Patent: Nov. 10, 2026

(54) SHAFT SEAL ASSEMBLY

(71) Applicant: Inpro/Seal LLC, Rock Island, IL (US)

(72) Inventor: David Stegman, Bettendorf, IA (US)

(73) Assignee: Inpro/Seal LLC, Rock Island, IL (US)

( * ) Notice: Subject to any disclaimer, the term of this patent is extended or adjusted under 35 U.S.C. 154(b) by 0 days.

(21) Appl. No.: 18/829,658

(22) Filed: Sep. 10, 2024

(65) Prior Publication Data

US 2026/0071678 A1 Mar. 12, 2026

(51) Int. Cl.
*F16J 15/18* (2006.01)

(52) U.S. Cl.
CPC ........... *F16J 15/183* (2013.01); *F16J 15/184* (2013.01)

(58) Field of Classification Search
CPC ......... F16J 15/183; F16J 15/184; F16J 15/187
See application file for complete search history.

(56) References Cited

U.S. PATENT DOCUMENTS

| | | | | |
|---|---|---|---|---|
| 2,628,112 A * | 2/1953 | Hebard | F16J 15/187 277/516 |
| 4,185,837 A * | 1/1980 | Greene | F16J 15/406 277/400 |
| 4,480,842 A * | 11/1984 | Mahyera | F16J 15/187 277/516 |
| 8,267,635 B2 * | 9/2012 | Brey | B65G 69/08 52/192 |
| 11,543,031 B2 | 1/2023 | Hoehle et al. | |
| 11,686,349 B2 * | 6/2023 | Beattie | F16J 15/3268 277/506 |
| 2010/0239398 A1 * | 9/2010 | Brey | B65G 69/08 52/192 |

OTHER PUBLICATIONS

International Search Report and Written Opinion in International Appln. No. PCT/US2025/044189, mailed on Oct. 16, 2025, 10 pages.

* cited by examiner

*Primary Examiner* — Nicholas L Foster
(74) *Attorney, Agent, or Firm* — Fish & Richardson P.C.

(57) ABSTRACT

Implementations of a shaft seal assembly include a throttle that is configured to receive a shaft therethrough, a set of packing rings, each packing ring in the set of packing rings being configured to receive a shaft therethrough, a packing case that at least partially surrounds the throttle and the set of packing rings, and a packing follower that is axially adjustable relative to the packing case to impart an axial force on the packing rings in the set of packing rings and the throttle to provide a seal between the shaft seal assembly and the shaft, the shaft seal assembly being angularly articulable and radially movable in response to movement of the shaft.

21 Claims, 7 Drawing Sheets

SHAFT SEAL ASSEMBLY

BACKGROUND

A shaft seal assembly enables a shaft to operably extend from an external environment (e.g., atmosphere) into an internal environment (e.g., a mixing chamber), while providing a seal between the environments. The seal can be provided using a pressurized sealing fluid (e.g., air) that forms a pressurized seal within the shaft seal assembly. Shaft seal assemblies can be used in various applications, such as industrial processes. For example, shaft seal assemblies can be used in industrial processing equipment for powders, liquids, slurries, and bulk solids to prevent product loss, harmful emissions, and/or contamination between environments. In general, a shaft seal assembly articulates to simultaneously accommodate radial run-out, axial movement, and angular misalignment of the shaft.

Conventional shaft seal assemblies suffer from certain drawbacks. For example, leakage from a shaft seal assembly results in waste of sealing gas and inhibits developing sufficient pressure between the shaft and a throttle of the shaft seal assembly. Conventional approaches that include a packing case and follower do not have any ability to articulate and move radially with the shaft, which results in increased packing wear and down time. In some instances, sealing gas can leak into the internal environment. This can be particularly problematic in vacuum applications, in which a vacuum is maintained within the internal environment. Conventional shaft seal assemblies that are designed to address these issues suffer from other limitations. Example limitations include lack of split design (e.g., semi-circular components that can be assembled), utilization of complex and expensive custom lip seals, utilization of steam as the sealing gas (which is not as readily available as air), and expensive and large designs.

For example, one conventional shaft seal assembly uses a grease purge between lip seals as well as a bearing to stabilize the shaft and decrease shaft deflection. However, components of this conventional shaft seal assembly cannot be split, which complicates installation and maintenance. For example, when the seal fails, the seal cannot be easily and quickly repaired. In other words, it is not field-repairable.

SUMMARY

Implementations of the present disclosure are generally directed to shaft seal assemblies. More particularly, implementations of the present disclosure are directed to a shaft seal assembly that includes a throttle that is configured to receive a shaft therethrough, a set of packing rings, each packing ring in the set of packing rings being configured to receive a shaft therethrough, a packing case that at least partially surrounds the throttle and the set of packing rings, and a packing follower that is axially adjustable relative to the packing case to impart an axial force on the packing rings in the set of packing rings and the throttle to provide a seal between the shaft seal assembly and the shaft, the shaft seal assembly being angularly articulable and radially movable in response to movement of the shaft.

These and other implementations can each optionally include one or more of the following features: the throttle includes a groove that defines a chamber between the throttle and the shaft, the chamber receiving a flow of pressurized sealing fluid to generate a pressurized seal between the throttle and the shaft; the flow of pressurized fluid flows through at least one radial bore of the throttle into the chamber; the throttle is disposed between packing rings of the set of packing rings; the set of packing rings includes a first sub-set of packing rings disposed on a first side of the throttle and a second sub-set of packing rings disposed on a second side of the throttle; the first sub-set of packing rings includes fewer packing rings than the second sub-set of packing rings; the shaft seal assembly further includes a tightening mechanism that holds the packing follower in position relative to the packing case and that is tightenable to impart the axial force; the tightening mechanism includes one or more bolts and one or more nuts, each bolt being fixed to the packing case and extending through the packing follower, each nut being tightenable on a respective bolt to impart the axial force; each packing ring includes a braided packing material; the shaft seal assembly further includes a cap that retains the throttle, the set of packing rings, and the packing case in the shaft seal assembly; and the cap is securable through threaded engagement to a stator that the packing case is disposed within.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Implementations of the present disclosure are generally directed to shaft seal assemblies. More particularly, implementations of the present disclosure are directed to a shaft seal assembly that includes a throttle that is configured to receive a shaft therethrough, a set of packing rings, each packing ring in the set of packing rings being configured to receive a shaft therethrough, a packing case that at least partially surrounds the throttle and the set of packing rings, and a packing follower that is axially adjustable relative to the packing case to impart an axial force on the packing rings in the set of packing rings and the throttle to provide a seal between the shaft seal assembly and the shaft, the shaft seal assembly being angularly articulable and radially movable in response to movement of the shaft.

Figure 2:
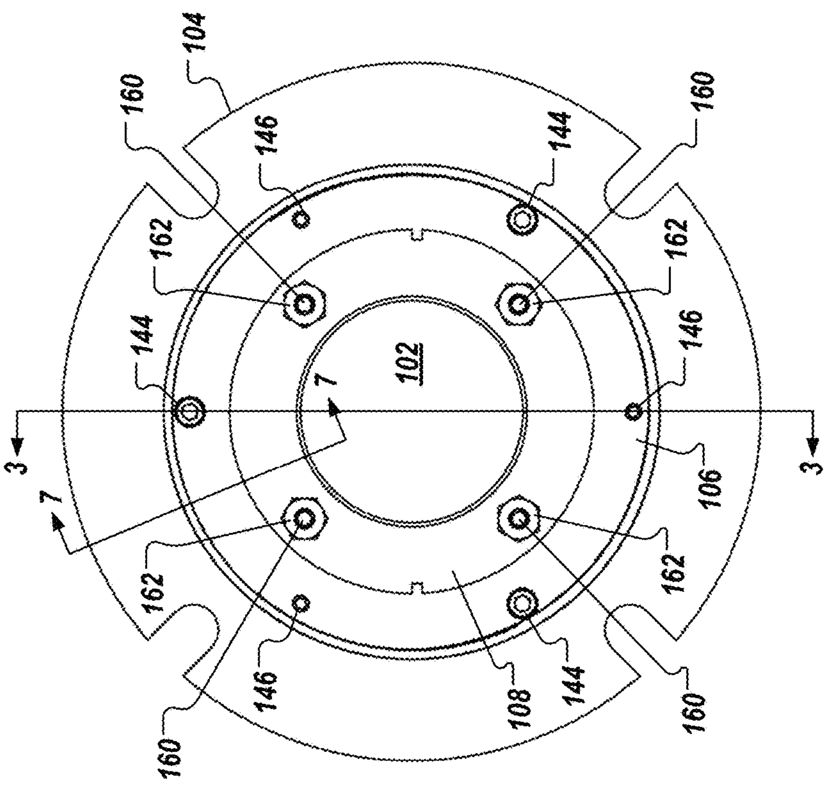
FIG. 2 depicts a front view of the shaft seal assembly in accordance with implementations of the present disclosure.
Figure 1:
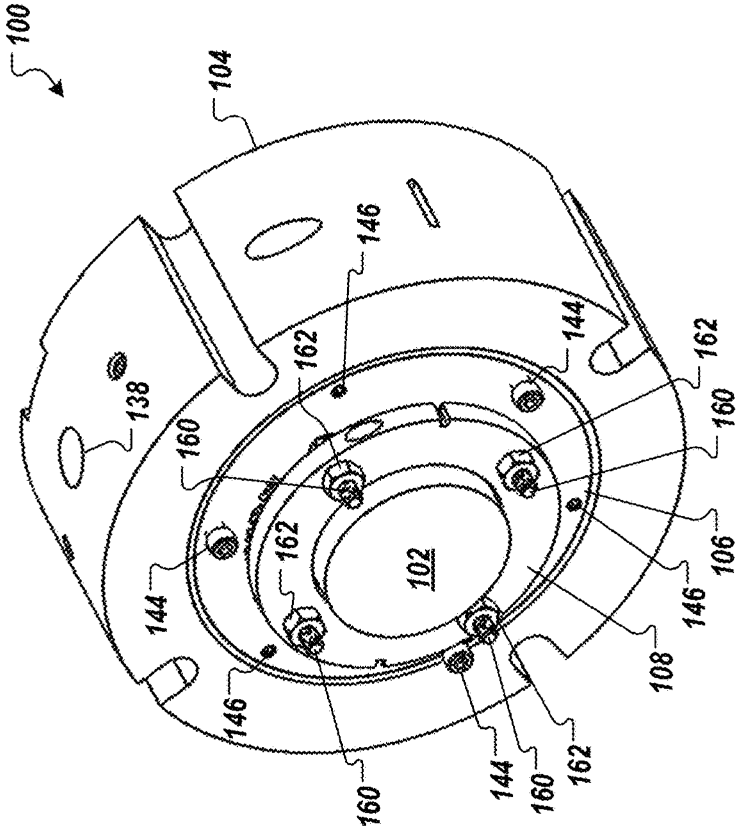
FIG. 1 depicts an isometric view of a shaft seal assembly in accordance with implementations of the present disclosure.

FIG. 1 depicts an isometric view of a shaft seal assembly 100 and FIG. 2 depicts a front view of the shaft seal assembly 100 in accordance with implementations of the present disclosure. As described in further detail herein, the shaft seal assembly 100 is configured to receive a shaft 102 (e.g., of industrial equipment, such as a mixer). In the examples of FIGS. 1 and 2, the shaft seal assembly 100 includes a stator 104, a cap 106, and a packing follower 108.

Figure 3:
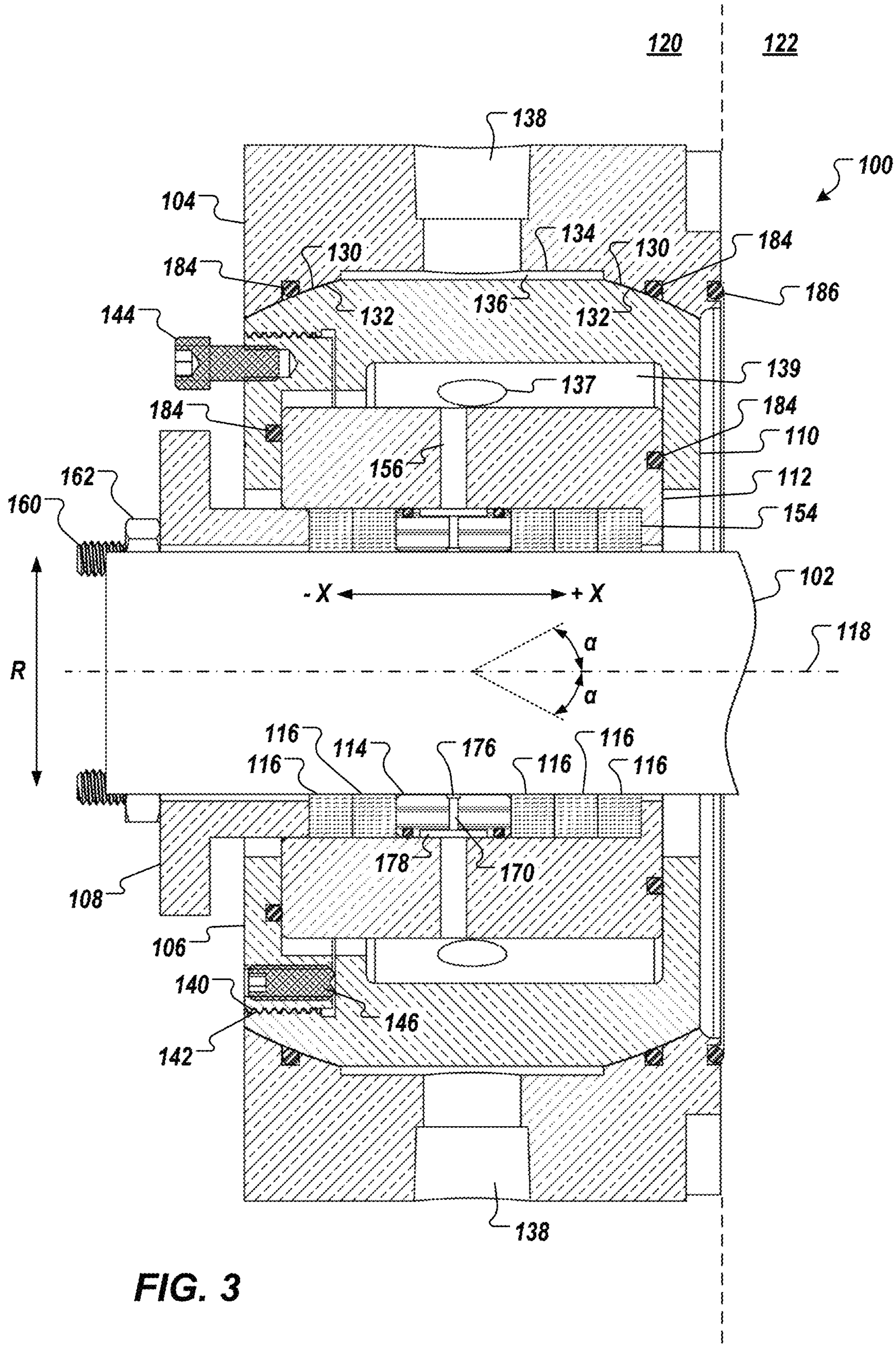
FIG. 3 depicts a cross-sectional view of the shaft seal assembly along the line 3-3 of FIG. 2.

FIG. 3 depicts a cross-sectional view of the shaft seal assembly 100 along the line 3-3 of FIG. 2. In the example of FIG. 3, the shaft seal assembly 100 includes a stator 110, a packing case 112, a throttle 114, and packing rings 116. The shaft 102 is rotatable about an axis 118 within the shaft seal assembly 100, which provides a seal between a first side 120 and a second side 122. In some examples, the first side 120 represents a first pressure and the second side represents a second pressure. For example, the shaft seal assembly 100 can be mounted to industrial equipment, where the shaft 102 extends into a chamber (e.g., a mixing chamber) of the industrial equipment. In this example, the first side 120 is external to the industrial equipment and the second side 122 is internal to the industrial equipment. In some examples, the first pressure (e.g., atmosphere) of the first side 120 is greater than the second pressure (e.g., vacuum) of the second side 122.

As described in further detail herein, the shaft seal assembly 100 articulates to simultaneously accommodate radial run-out, axial movement, and angular misalignment of the shaft 102. That is, for example, and with reference to FIG. 3, as the shaft 102 rotates about the axis 118, the shaft seal assembly 100 accommodates excursions of the shaft 102 in an axial direction X, a radial direction R, and at angles $\alpha$ relative to the axis 118, while maintaining the seal between the first side 120 and the second side 122.

In further detail, and with continued reference to FIG. 3, the stator 110 is located within the stator 104. As such, the stator 110 can be referred to as an internal stator and the stator 104 can be referred to as an external stator. The stator 110 is movable relative to the stator 104. For example, the stator 110 can at least partially rotate about the axis 118 and can articulate at the angles $\alpha$ with excursions of the shaft 102. As such, the stator 104 can be referred to as a fixed stator (e.g., fixedly secured to industrial equipment) and the stator 110 can be referred to as a floating stator. In some examples, the stator 104 is fixed to an external component (e.g., industrial equipment, such as a mixer). As such, the stator 104 can also be referred to as a flange.

In the example of FIG. 3, the stator 104 includes radial interior surfaces 130 and the stator 110 includes radial exterior surfaces 132 that collectively define an interface between the stator 104 and the stator 110. The radial interior surfaces 130 are provided as convex surfaces and the radial exterior surfaces 132 are provided as concave surfaces to define the interface as a rotational interface between the stator 104 and the stator 110. In this manner, the stator 110 can at least partially rotate about the axis 118 and can articulate at the angles $\alpha$ with excursions of the shaft 102 relative to the stator 104. In some examples, clearance is provided between the radial exterior surface 132 and the radial interior surfaces 130 to allow for a predetermined amount of relative radial and/or axial movement between the stator 104 and the stator 110.

In the example of FIG. 3, the stator 104 includes a groove 134 that defines a channel 136 between the stator 104 and the stator 110. The stator 104 includes radial inlets 138. In some examples, a pressurized sealing fluid can flow into the shaft seal assembly 100 through the radial inlets 138 and into the channel 136. The stator 110 includes radial bores 137 that enable the pressurized sealing fluid to flow through the stator 110, as described in further detail herein.

In the example of FIG. 3, the packing case 112 is located within the stator 110 and the cap 106 is mounted to the stator 110 to retain the packing case 112 within the stator 110. A chamber 139 is defined between the stator 110 and the packing case 112. A flow of pressurized sealing fluid flows into the chamber 139 through the radial bores 137.

In some examples, the stator 110 includes a radial interior surface 140 that is threaded and the cap 106 includes a radial exterior surface 142 that is threaded. In this manner, the cap 106 can be screwed onto the stator 110 to retain the packing case 112 within the stator 110. In some examples, one or more fasteners 144 can be fastened to the cap 106 (see also FIGS. 1 and 2) to enable the cap 106 to be assembled onto or disassembled from the stator 110. For example, the fasteners 144 can be fastened to the cap 106 and can be used as grips to rotate the cap 106 relative to the stator 110 (e.g., to assemble/disassemble the cap 106 onto/from the stator 110).

Once the cap 106 is in place, the fasteners 144 can be unfastened from the cap 106. In the example of FIGS. 1-3, three fasteners 144 are depicted. It is contemplated, however, that any appropriate number of fasteners 144 can be provided.

In some examples, fasteners 146 (e.g., set screws) are provided to lock the cap 106 in position relative to the stator 110 (see also FIGS. 1 and 2). That is, the fasteners 146 inhibit rotation of the cap 106 relative to the stator 110. In the example of FIGS. 1-3, three fasteners 146 are depicted. It is contemplated, however, that any appropriate number of fasteners 146 can be provided.

Figure 4:
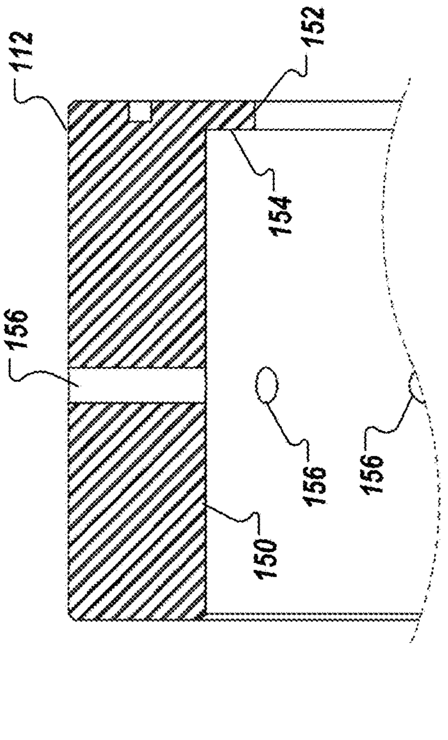
FIG. 4 depicts a cross-sectional view of a portion of a packing case of the shaft seal assembly in accordance with implementations of the present disclosure.

FIG. 4 depicts a cross-sectional view of a portion of the packing case 112 of the shaft seal assembly 100 in accordance with implementations of the present disclosure. With reference to FIGS. 3 and 4, the packing case 112 has a generally L-shaped cross-section and includes a first radial interior surface 150 and a second radial interior surface 152. The first radial interior surface 150 has a diameter that is larger than a diameter of the second radial interior surface 152. The diameter of the second radial interior surface 152 is larger than a diameter of the shaft 102, such that the packing case 112 is radially offset from the shaft 102. In this manner, there is no direct contact between the shaft 102 and the packing case 112. A stopping face 154 is defined between the first radial interior surface 150 and the second radial interior surface 152. The packing case 112 further includes radial bores 156. The flow of pressurized sealing fluid flows from the chamber 139 into the radial bores 156.

With continued reference to FIG. 3, the throttle 114 and the packing rings 116 are seated within the packing case 112 around the shaft 102. In some examples, at least one packing ring 116 is provided on each side of the throttle 114. In the example of FIG. 3, multiple packing rings 116 are provided on either side of the throttle 114. For example, a first number of packing rings 116 are provided on a first side of the throttle 114 (e.g., lefthand side of the throttle 114 as depicted in FIG. 3), and a second number of packing rings 116 are provided on a second side of the throttle 114 (e.g., righthand side of the throttle 114 as depicted in FIG. 3). In some examples, the first number of packing rings 116 is greater than the second number of packing rings 116. For example, and in the example of FIG. 3, two packing rings 116 are provided on the first side of the throttle 114 and three packing rings 116 are provided on the second side of the throttle 114.

In some implementations, the packing rings 116 are each made of a braided packing material. Implementations of the present disclosure can be realized using any appropriate type of braided packing material. Examples include, but are not limited to, carbon, PTFE, flax, acrylic, novoloid, and aramid. In some examples, the braided packing material can include integrated lubricant. In some examples, the particular type of braided packing material can be application-specific for, for example, chemical compatibility, shaft speed, temperature, and food grade requirements.

In accordance with implementations of the present disclosure, the packing follower 108 retains the throttle 114 and the packing rings 116 within the packing case 112. More particularly, the throttle 114 and the packing rings 116 are positioned between the packing follower 108 and the stopping face 154 of the packing case 112. In some examples, the packing follower 108 imparts an axial force in the +X axial direction to compress the packing rings 116. In response to the axial force in the +X axial direction, the packing rings 116 can expand in the radial direction R. For example, the packing rings 116 can expand inward toward the axis 118 and can expand outward toward the packing case 112.

In some examples, a tightening mechanism is provided to hold the packing follower 108 in position relative to the packing case 112 and to impart the axial force on the throttle 114 and the packing rings 115. In the example of FIG. 3, and as also depicted in FIGS. 1 and 2, an example tightening mechanism includes bolts 160 and respective nuts 162. In the example of FIGS. 1-3, four bolts 160 and nuts 162 are depicted. It is contemplated, however, that any appropriate number of bolts 160 and nuts 162 can be provided.

Figure 5:
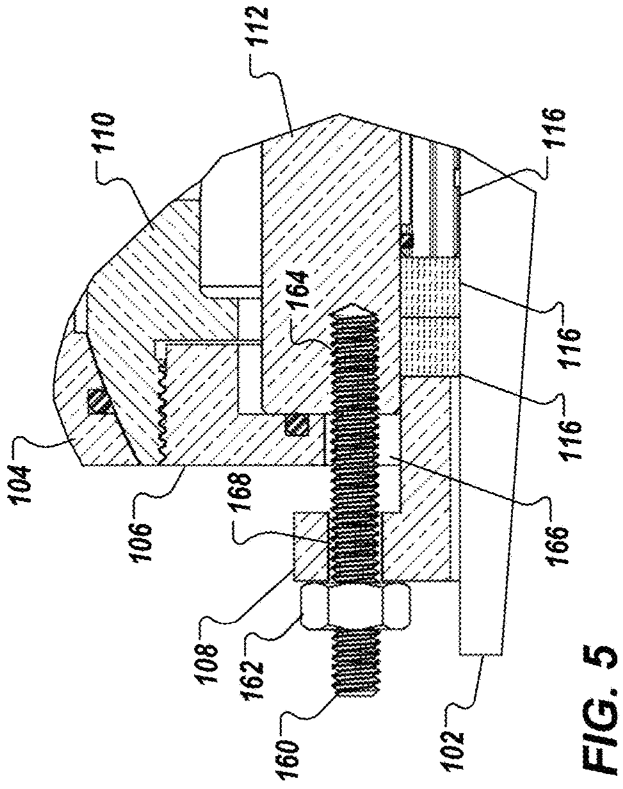
FIG. 5 depicts a partial cross-sectional view of a portion of the shaft seal assembly in accordance with implementations of the present disclosure.

With reference to FIG. 5, and in some examples, the bolts 160 are secured to and extend from the packing case 112. For example, the packing case 112 can include holes 164 that the bolts 160 are threaded into. In some examples, the cap 106 includes holes 166 that enable the bolts 160 to pass through and the packing follower 108 includes holes 168 that enable the bolts 160 to pass through. As the nuts 162 are tightened, the packing follower 108 is pushed in the +X axial direction (see FIG. 3) against the packing rings 116 and the throttle 114.

Figure 6:
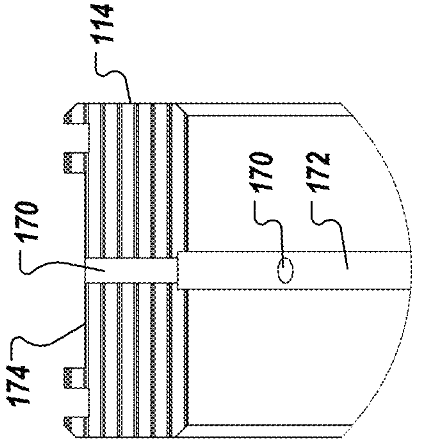
FIG. 6 depicts a cross-sectional view of a portion of a throttle of the shaft seal assembly in accordance with implementations of the present disclosure.

With particular reference to FIGS. 3 and 6, the throttle 114 includes radial bores 170, a groove 172 formed in a radial interior surface, and a groove 174 formed in a radial exterior surface. With particular reference to FIG. 3, the groove 172 defines a chamber 176 between the throttle 114 and the shaft 102 (about the circumference of the shaft 102), and the groove 174 defines a chamber 178 between the throttle 114 and the packing case 112 (about the circumference of the throttle 114). As described in further detail herein, the flow of pressurized fluid enters the chamber 178 through the radial bores 156 of the packing case 112 and flows through the radial bores 170 of the throttle 114 into the chamber 176.

In general, the shaft seal assembly 100, and components thereof, are static relative to the shaft 102. That is, while the shaft 102 is able to rotate 102, the shaft seal assembly 100, and components thereof, do not rotate or are inhibited from rotation. However, it can occur that friction between the packing rings 116 and the shaft 102 can induce rotational movement of one or more of the packing rings 116 with the shaft 102. This can induce rotational movement of the packing case 112 due to friction between the one or more of the packing rings 116 and the packing case 112. If the packing case 112 is induced to rotate, the bolts 160 will rotate to push against walls of the holes 166, which induces rotation of the stator 104.

Figure 7:
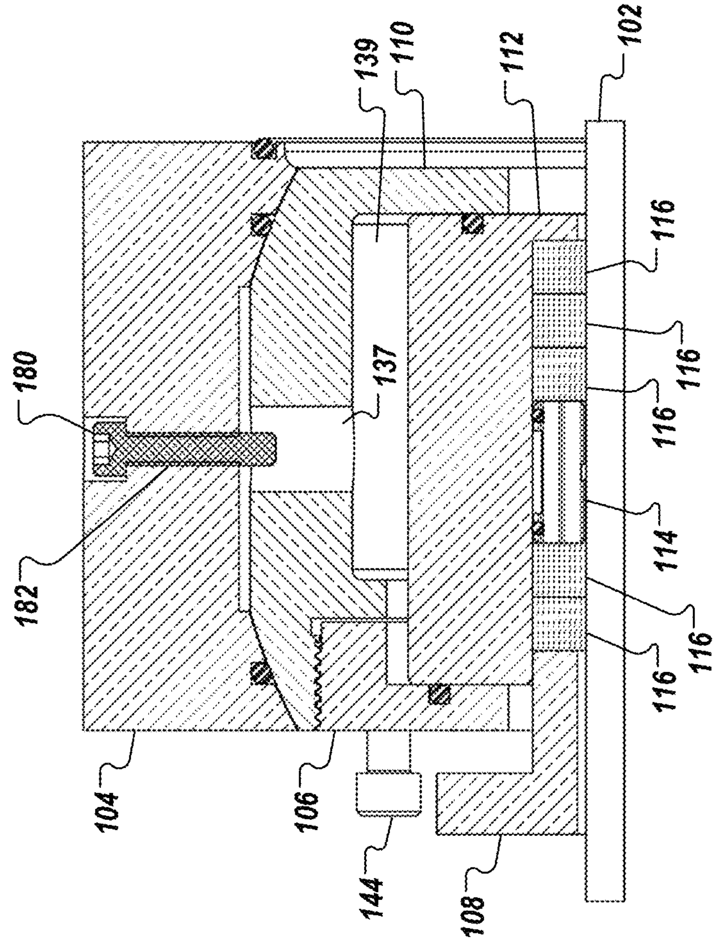
FIG. 7 depicts a cross-sectional view of the shaft seal assembly along the line 7-7 of FIG. 2.

In view of this, implementations of the present disclosure provide an anti-rotation mechanism to inhibit rotation of components of the shaft seal assembly 100. More particularly, FIG. 7 depicts a cross-sectional view of the shaft seal assembly 100 along the line 7-7 of FIG. 2. In the example of FIG. 7, the anti-rotation mechanism includes one or more anti-rotation pins 180 that extend through respective holes 182 of the stator 104 and at least partially into the stator 110. For example, each anti-rotation pin 180 at least partially extends into a respective radial bore 137 of the stator 110. In some examples, the anti-rotation pins 180 are provided as screws that screw into the holes 182. The anti-rotation mechanism inhibits rotation of the stator 110, and thus the packing case 112 and components therebetween. For example, if the packing case 112 is induced to rotate, which induces the stator 110 to rotate, as described above, a degree of rotation can occur until the walls of the radial bores 137 contact the anti-rotation pins 180 to prevent further rotation.

In accordance with implementations of the present disclosure, a pressurized sealing fluid flows through components of the shaft seal assembly 100. In order to inhibit leakage of the pressurized sealing fluid from the shaft seal assembly 100, seals 184 are provided between various components. For example, seals 184 are provided between the stator 104 and the stator 110, a seal 184 is provided between the cap 106 and the packing case 112, and a seal 184 is provided between the stator 110 and the packing case 112. Further, a seal 186 is provided to create a seal between the shaft seal assembly 100 and another surface, such as a housing of industrial equipment. In some examples, the seals 184, 186 are each provided as an o-ring (e.g., rubber o-ring).

As described herein, the pressurized sealing fluid creates a pressurized seal between the throttle 114 and the shaft 102. For example, the pressurized sealing fluid flows from a source (external to the shaft seal assembly) into the radial inlets 138 to the chamber 136, from the chamber 136 through the radial bores 137 into the chamber 139, from the chamber 139 through the radial bores 156 into the chamber 176, from the chamber 176 through the radial bores 170 into the chamber 176. The pressurized sealing fluid creates the pressurized seal within the chamber 176 and a gap between the throttle 114 and the shaft 102 (about the circumference of the shaft 102). The packing rings 116 inhibit leakage of the pressurized fluid to either the first side 120 and the second side 122 of the shaft seal assembly 100.

In further detail, and as introduced above, the packing follower 108 imparts an axial force in the +X axial direction to compress the packing rings 116, which induces the packing rings 116 to expand in the radial direction R inward toward the shaft 102 and can expand outward toward the packing case 112. In this manner, the packing rings 116 provide a pressurized seal within the chamber 176 and the gap between the shaft 102 and the throttle 114. That is, the packing rings 116 inhibit the flow of pressurized sealing fluid to the first side 120 and/or the second side. In the example of FIG. 3, there is a greater number of pressurized rings 116 on the side of the throttle 114 that is closer to the second side 122. In this manner, a stronger seal is provided on the side of the throttle 114 that is closer to the second side 122. This is helpful in scenarios where the second side 122 includes a relatively low pressure (e.g., a vacuum).

Through extended rotation of the shaft 102, the packing rings 116 can wear. This can result in space forming between the packing rings 116 and the shaft 102 and diminishing of the pressurized seal therebetween. This can result in leakage of the pressurized sealing fluid (e.g., toward the first side 120 and/or the second side 122). To correct for this, the tightening mechanism can be used to push the packing follower 108 in the +X axial direction to further compress the packing rings 116 (e.g., the nuts 162 can be tightened on the bolts 160). In this manner, any space between the packing rings 116 and the shaft 102 can be reduced to maintain the pressurized seal. It can occur that one or more of the packing rings 116 wears to the point that replacement is required. Accordingly, the shaft seal assembly 100 can be at least partially disassembled to remove and replace the packing rings 116.

Figure 9:
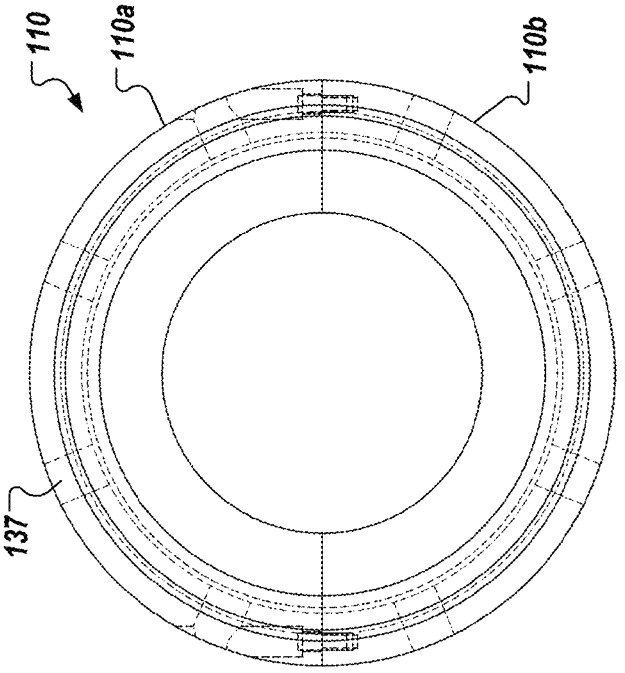
FIGS. 8 and 9 are plan views of respective stators in accordance with implementations of the present disclosure.
Figure 8:
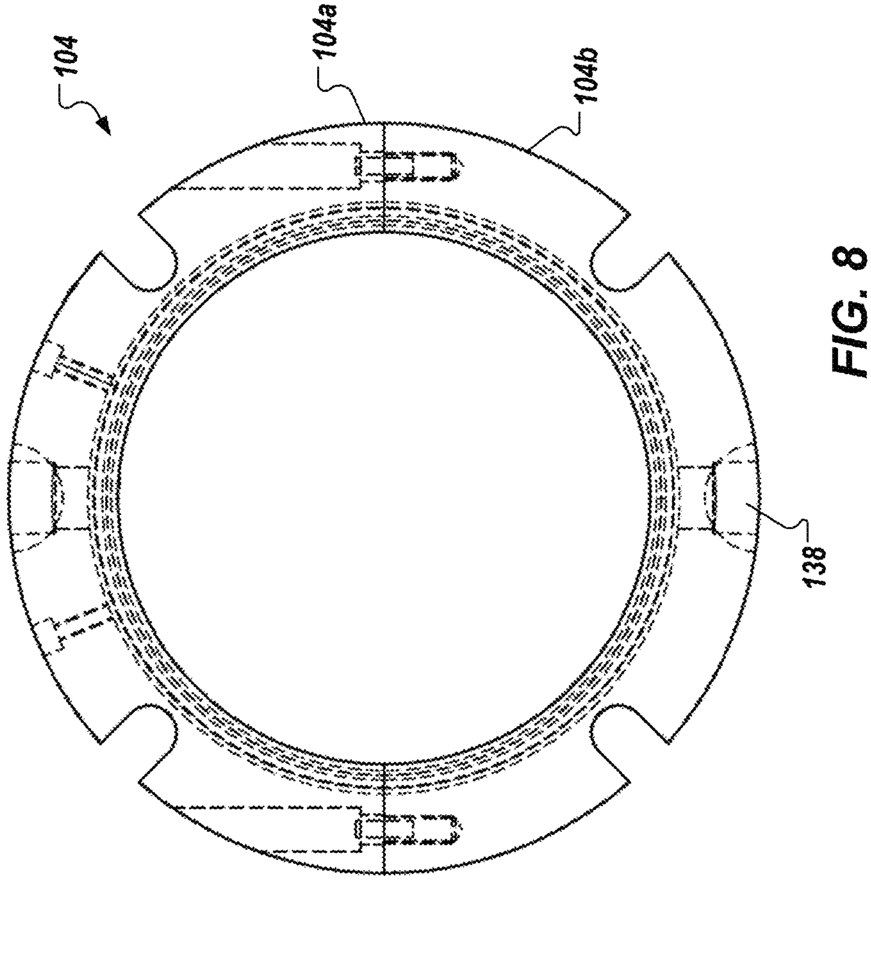
Figure 11:
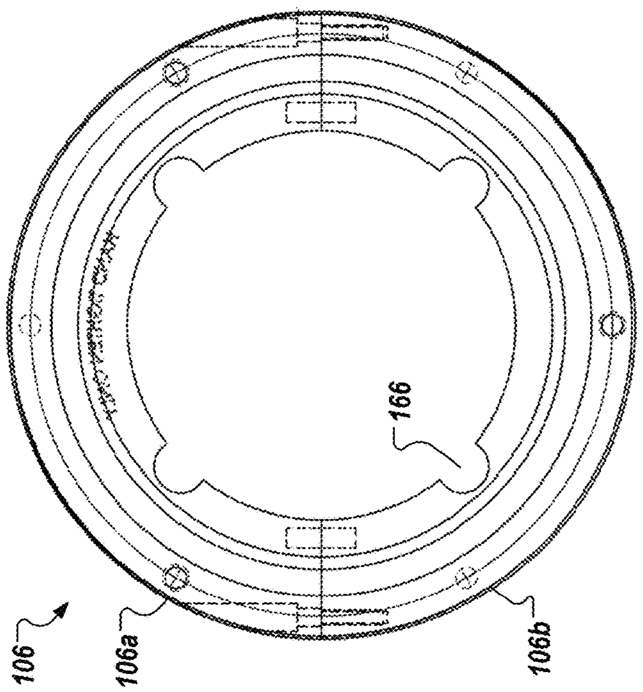
FIG. 11 is a plan view of a cap in accordance with implementations of the present disclosure.
Figure 10:
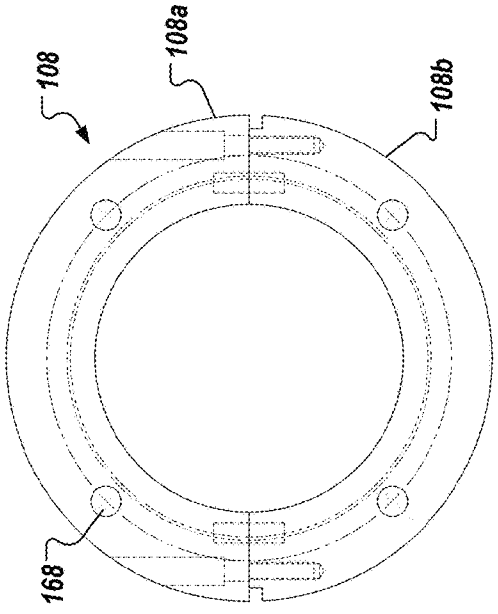
FIG. 10 is a plan view of a packing follower in accordance with implementations of the present disclosure.
Figure 12:
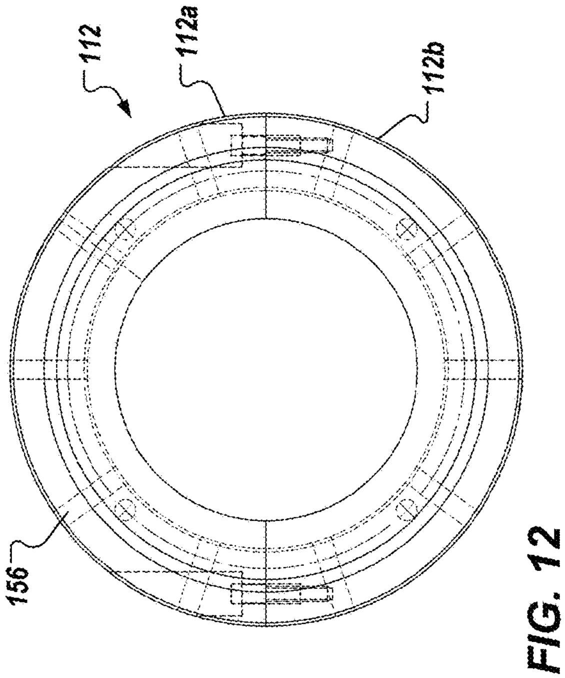
FIG. 12 is a plan view of a packing case in accordance with implementations of the present disclosure.

In some implementations, components of the shaft seal assembly 100 can include a split design that enables the shaft seal assembly 100 to be assembled and disassembled with relative ease. In this manner, the shaft seal assembly 100 can be described as being field-repairable, for example. FIGS. 8 and 9 are plan views of the stator 104 and the stator 110, respectively, in accordance with implementations of the present disclosure. In the example of FIG. 8, the stator 104 includes a stator half **104*a* and a stator half 104*b* that can be secured together to form the stator 104. In some examples, the stator half 104*a* and the stator half 104*b* are secured together by one or more fasteners (e.g., screws). In the example of FIG. 9, the stator 110 includes a stator half 110*a* and a stator half 110*b* that can be secured together to form the stator 110. In some examples, the stator half 110*a* and the stator half 110*b* are secured together by one or more fasteners (e.g., screws). FIG. 10 is a plan view of the packing follower 108 in accordance with implementations of the present disclosure. In the example of FIG. 10, the packing follower 108 includes a packing follower half 108*a* and a packing follower half 108*b* that can be secured together to form the packing follower 108. In some examples, the packing follower half 108*a* and the packing follower half 108*b* are secured together by one or more fasteners (e.g., screws). FIG. 11 is a plan view of the cap 106 in accordance with implementations of the present disclosure. In the example of FIG. 11, the cap 106 includes a cap half 106*a* and a cap half 106*b* that can be secured together to form the cap 106. In some examples, the cap half 106*a* and the cap half 106*b* are secured together by one or more fasteners (e.g., screws). FIG. 12 is a plan view of the packing case 112 in accordance with implementations of the present disclosure. In the example of FIG. 12, the packing case 112 includes a packing case half 112*a* and a packing case half 112*b* that can be secured together to form the packing case 112. In some examples, the packing case half 112*a* and the packing case half 112*b*** are secured together by one or more fasteners (e.g., screws).

Figure 13:
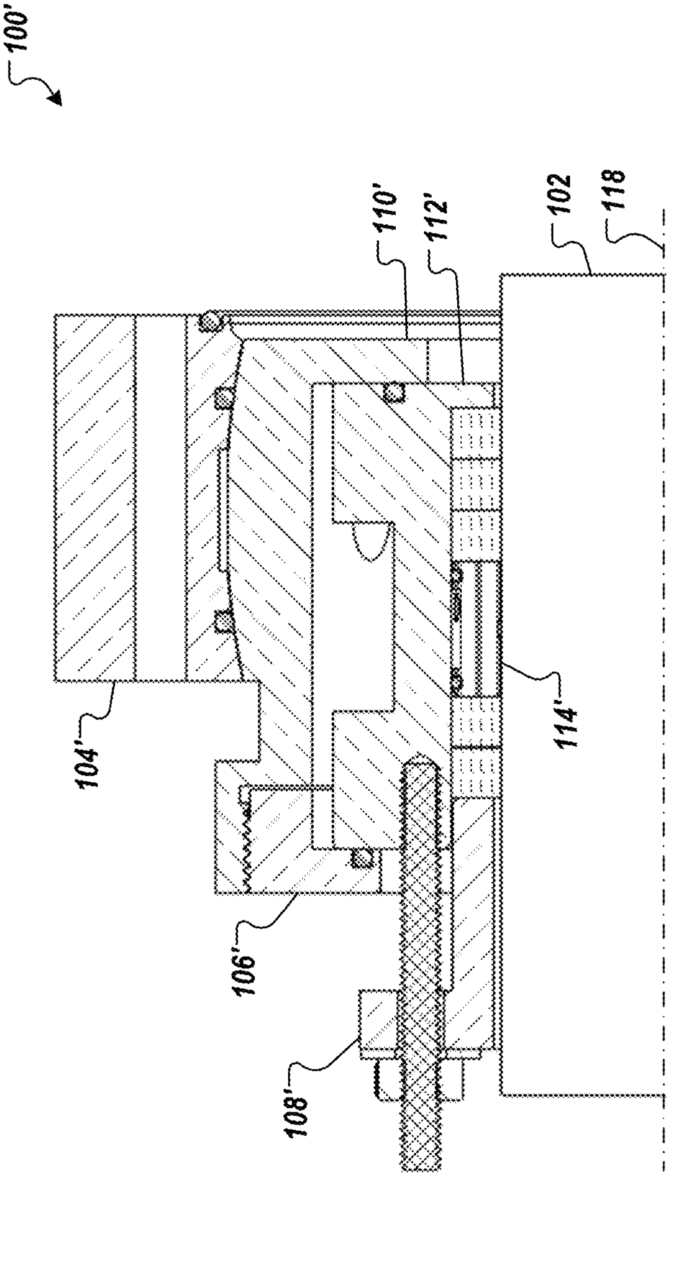
FIG. 13 depicts a cross-sectional view of a shaft seal assembly in accordance with implementations of the present disclosure.

FIG. 13 depicts a cross-sectional view of a shaft seal assembly 100' in accordance with implementations of the present disclosure. The shaft seal assembly 100' of FIG. 13 represents a lower profile version of the shaft seal assembly 100 of FIGS. 1-12 and includes some identical components and some similar components. For example, the shaft seal assembly 100' of FIG. 13 includes a stator 104', a cap 106', a packing follower 108', a stator 110', a packing case 112', and a throttle 114'. In general, components of the shaft seal assembly 100' of FIG. 13, such as the stator 104' and the stator 110' have a lower profile (reduced amount of material) as compared to components of the shaft seal assembly 100 of FIGS. 1-12, such as the stator 104 and the stator 110.

As described in detail herein, implementations of the shaft seal assembly of the present disclosure provide numerous advantages over conventional shaft seal assemblies. For example, implementations of the present disclosure use the packing rings (braided packing) to form a low gas consumption shaft seal that can effectually seal against a vacuum. The shaft seal assembly of the present disclosure is able to "float" radially with the shaft to accommodate for any radial shaft movement as well as adjust for any angular shaft misalignment with respect to a housing (e.g., of industrial equipment). The shaft seal assembly of the present disclosure is able to articulate as a result of the interface between the stators. Further, the threaded cap also provides an adjustable axial force on the carrier to ensure a correct force is applied regardless of tolerances (e.g., o-ring and/or machining tolerances). In this manner, the axial force on the carrier makes a seal between the cap and the carrier while also allowing for the carrier to "float" with the shaft since it can be adjusted as to never be too tight (inhibiting radial shaft movement) or too loose (inhibiting sealing capability with cap and carrier). The packing follower applies axial force to the packing itself because it screws into the carrier. This way there is no additional axial force on the carrier that would inhibit radial movement with the shaft. Also, the fasteners (e.g., set screws) that are tightened to lock the cap in place with respect to the stator, enables the packing case to "float" about the shaft, while also providing a sufficient seal. Further, the pressurized seal provides a pressure barrier that acts to cushion the movement of the shaft. This decreases wear on the throttle (e.g., on the inside diameter) as well as the packing rings helping the packing carrier to "react" to radial shaft movement.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A shaft seal assembly, comprising:

a stator;

a throttle that is configured to receive a shaft therethrough, the throttle comprising one or more shaft-facing surfaces defining a groove that is configured to define, together with the shaft, a chamber configured to receive a flow of pressurized sealing fluid to generate a pressurized seal between the throttle and the shaft;

a set of packing rings, each packing ring in the set of packing rings being configured to receive the shaft therethrough;

a packing case that is disposed within the stator and that at least partially surrounds the throttle and the set of packing rings; and a packing follower that is axially adjustable relative to the packing case to impart an axial force on the packing rings in the set of packing rings and the throttle to provide a seal between the shaft seal assembly and the shaft, wherein, in response to movement of the shaft: (i) the throttle and the packing case are radially translatable relative to the stator, and (ii) the throttle, the packing case, and the stator are together angularly articulable.

2. The shaft seal assembly of claim 1, wherein the throttle defines at least one radial bore configured to allow the pressurized sealing fluid to flow therethrough into the chamber.

3. The shaft seal assembly of claim 1, wherein the throttle is disposed between packing rings of the set of packing rings.

4. The shaft seal assembly of claim 1, wherein the set of packing rings comprises a first sub-set of packing rings disposed on a first side of the throttle and a second sub-set of packing rings disposed on a second side of the throttle.

5. The shaft seal assembly of claim 4, wherein the first sub-set of packing rings comprises fewer packing rings than the second sub-set of packing rings.

6. The shaft seal assembly of claim 1, further comprising a tightening mechanism that holds the packing follower in position relative to the packing case and that is tightenable to impart the axial force.

7. The shaft seal assembly of claim 6, wherein the tightening mechanism comprises one or more bolts and one or more nuts, each bolt being fixed to the packing case and extending through the packing follower, each nut being tightenable on a respective bolt to impart the axial force.

8. The shaft seal assembly of claim 1, wherein each packing ring comprises a braided packing material.

9. The shaft seal assembly of claim 1, further comprising a cap that retains the throttle, the set of packing rings, and the packing case in the shaft seal assembly.

10. The shaft seal assembly of claim 9, wherein the cap is securable through threaded engagement to a stator that the packing case is disposed within.

11. The shaft seal assembly of claim 10, wherein the cap comprises a threaded radial exterior surface, and wherein the cap is securable through threaded engagement to the stator via the threaded radial exterior surface of the cap.

12. A shaft seal assembly, comprising:

a first stator;

a second stator that is disposed within the first stator and that is movable relative to the first stator, the second stator at least partially containing:

a throttle that is configured to receive a shaft therethrough, the throttle comprising one or more shaft-facing surfaces defining a groove that is configured to define, together with the shaft, a chamber configured to receive a flow of pressurized sealing fluid to generate a pressurized seal between the throttle and the shaft, a set of packing rings, each packing ring in the set of packing rings being configured to receive the shaft therethrough, and a packing case that at least partially surrounds the throttle and the set of packing rings; and a packing follower that is axially adjustable relative to the packing case to impart an axial force on the packing rings in the set of packing rings and the throttle to provide a seal between the shaft seal assembly and the shaft, wherein, in response to movement of the shaft: (i) the throttle and the packing case are radially translatable relative to the second stator, and (ii) the throttle, the packing case, and the second stator are together angularly articulable.

13. The shaft seal assembly of claim 12, wherein the throttle defines at least one radial bore configured to allow the pressurized sealing fluid to flow therethrough into the chamber.

14. The shaft seal assembly of claim 12, wherein the throttle is disposed between packing rings of the set of packing rings.

15. The shaft seal assembly of claim 12, wherein the set of packing rings comprises a first sub-set of packing rings disposed on a first side of the throttle and a second sub-set of packing rings disposed on a second side of the throttle.

16. The shaft seal assembly of claim 15, wherein the first sub-set of packing rings comprises fewer packing rings than the second sub-set of packing rings.

17. The shaft seal assembly of claim 12, further comprising a tightening mechanism that holds the packing follower in position relative to the packing case and that is tightenable to impart the axial force.

18. The shaft seal assembly of claim 17, wherein the tightening mechanism comprises one or more bolts and one or more nuts, each bolt being fixed to the packing case and extending through the packing follower, each nut being tightenable on a respective bolt to impart the axial force.

19. The shaft seal assembly of claim 12, wherein each packing ring comprises a braided packing material.

20. The shaft seal assembly of claim 12, further comprising a cap that is releasably securable to the first stator to retain the throttle, the set of packing rings, and the packing case in the shaft seal assembly.

21. The shaft seal assembly of claim 20, wherein the cap comprises a threaded radial exterior surface, and wherein the cap is releasably securable to the first stator via the threaded radial exterior surface of the cap.

* * * * *